Aug. 18, 1942.   B. MEITNER   2,293,300
SEPARABLE FASTENER
Filed May 9, 1941
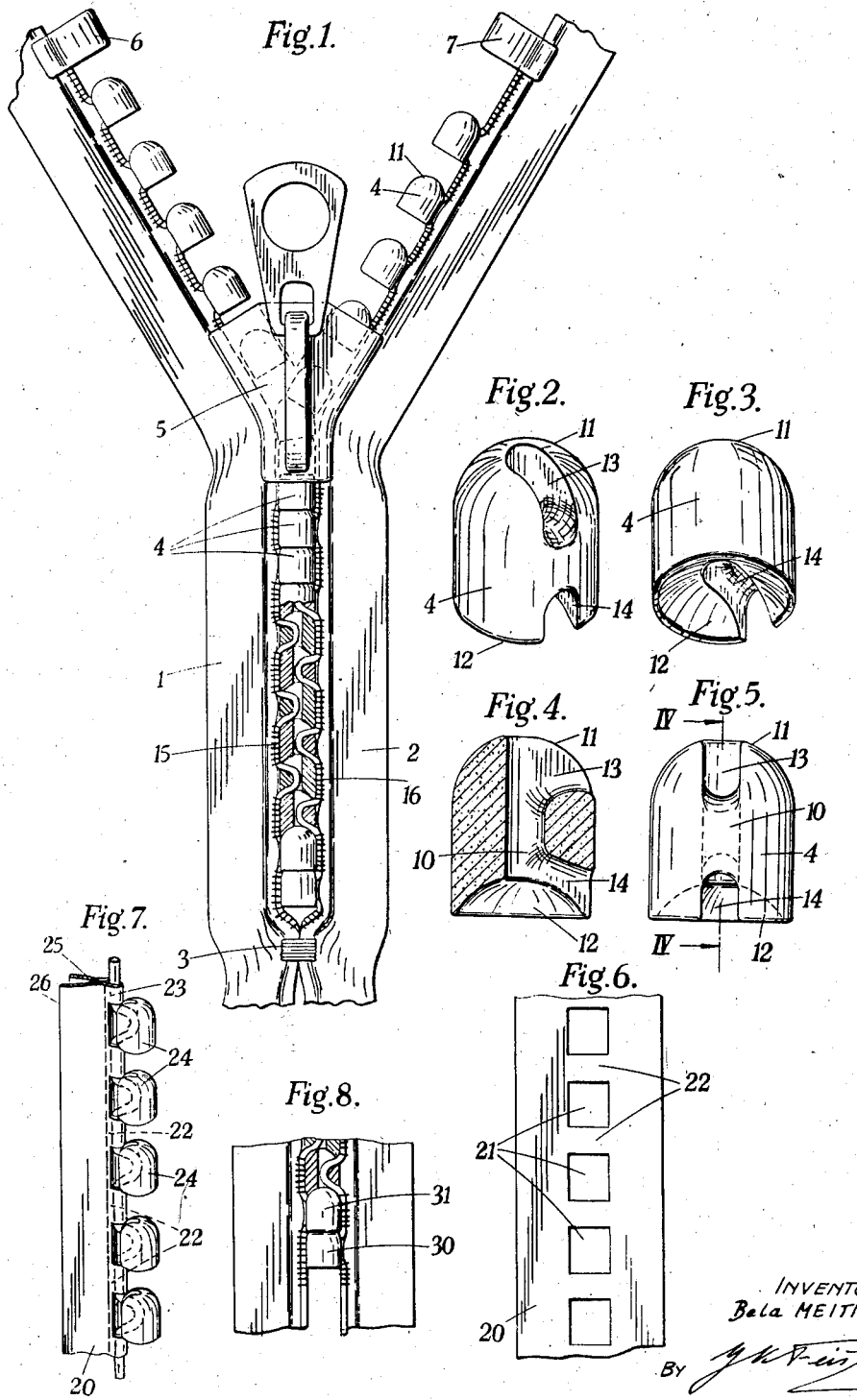
INVENTOR
Bela MEITNER
BY
ATTORNEY Patented Aug. 18, 1942

2,293,300

UNITED STATES PATENT OFFICE 2,293,300

SEPARABLE FASTENER

Bela Meitner, Glamorgan, England, assignor to Aero Zipp Fasteners Limited, London, England, a British company Application May 9, 1941, Serial No. 392,628
In Great Britain May 20, 1940

16 Claims. (Cl. 24—205)

This invention relates to separable fasteners of the kind having opposed series of interlocking fastener members secured to opposing free edges of a closure and adapted to be interlocked and disengaged progressively by means of a slider.

It is an object of this invention to provide a fastener the members of which are simple in construction, inexpensive to manufacture and easy to operate.

It is a further object of this invention to provide fastener elements which may be made of a great variety of materials.

Hitherto known fastening members have each comprised two parts, one part carrying the interlocking means, such as a projection and complementary recess, and the other serving to attach the member to a flexible support, for example, by clenching, in the case of metallic members, or by gluing or casting, in the case of non-metallic members.

It is another object of this invention to dispense with the attaching part.

These and other objects and advantages of the invention will appear from the following description taken in conjunction with the accompanying drawing which forms a part thereof, and in which Fig. 1 illustrates partly in section, a specific embodiment of a fastener according to this invention, Figs. 2 and 3 are different perspective views of a member of the fastener illustrated in Fig. 1, Fig. 4 is a section through the member along the line IV—IV of Fig. 5, Fig. 5 is an elevation of the member shown in Figs. 2, 3 and 4, Figs. 6 and 7 illustrate a modified manner of securing the members to a flexible support, and Fig. 8 illustrates a modification of the lower part of the fastener shown in Fig. 1.

Referring first to Figs. 1 to 5 the fastener comprises two flexible supports 1 and 2 such as a tape or an article in connection with which the fastener is to be used. At one end, the supports are held together in the usual manner by a stop member 3. The fastener members are generally denoted by numeral 4. The fastener is opened and closed by means of a slider 5 which is, in its upper, closing, position prevented from leaving the fastener by stop members 6 and 7.

Each member 4 has the shape of a small solid cylinder, one end 11 of which is convexly rounded off or tapered while the other end 12 is correspondingly concave so that a plurality of such members can be nested together with the convex end of a member accommodated in the adjacent concave end of the next member as shown in the lower part of Fig. 1.

Each member 4 has an axial bore 10 (see Figs. 4 and 5) merging, at the end 11 of the member, into a groove 13 and, at the other end 12 into a groove 14. Both grooves 13 and 14 extend in the same direction from the bore 10.

A plurality of members 4 are threaded, like beads, onto a wire string or similar filar carrier 15 (see Fig. 1). The filar carrier 15 is sewn onto or interwoven with the flexible support 1 to form a fastener stringer. Another filar carrier 16 carrying member 4 is similarly attached to the flexible support 2 to form a second stringer. The members 4 are fixed at the correct distance from one another by the sewing or weaving operation. The position of the members relatively to their respective flexible support is such that the free ends of the grooves 13 and 14 are adjacent the support, the filar carrier when emerging from the bore 10 of each member passing through the grooves 13 and 14 towards the support as shown in Fig. 1. The distance between adjacent members on each stringer is made substantially equal to the length of the cylindrical part of the member 4 that is excluding its convex portion 11. Finally the two stringers are joined together in the usual way to form together with the slider 5 and the stop members 3, and 6 and 7 the complete fastener, the members 4 of one stringer being staggered with respect to those of the other. In the closed position of the fastener, the convex end 11 of a member of one stringer engages the concave end 12 of the adjacent member of the other stringer. This engagement is facilitated by the grooves 13 and 14 of each member accommodating the filar carrier 15 or 16 outside the bore 10.

The members may be made of any suitable material and by any suitable process. They may be cast, moulded or stamped, and they may be made of metal or (and this is preferred) of a non-metallic material such as plastics, (synthetic resin and analogous materials), glass, ceramic material and wood.

The fastening members may have a shape different from that of the specific embodiment just described. The distance between the members may be maintained in any suitable manner, other than that described, for example, by distance pieces. Instead of sewing or weaving the filar carrier on to the tape, the filar carrier may be attached to the tape in any other suitable manner. For example, a tape 20 (see Figs. 6 and 7)

may be used which has a line of perforations 21 and may be folded along that line over the filar carrier 22 and the members 24 thereon in such a manner that the members 24 protrude through the perforations 21. The folded over parts 25 and 26 may then be fixed together in any convenient manner, for example by sewing the parts 25 and 26 along the line 23 or by gluing.

The fastener according to this invention is cheap to manufacture since the individual members, when non-metallic, are not pressed, cast or glued on to the tape, and when metallic are not clenched on to the tape, as with the usual methods. The members, moreover, may be given a great variety of easily fabricated shapes which could hitherto not be used for such members. Also, there is practically no limit to the variety of material that the invention enables to be used for such members. Glass may be used, as already mentioned, and this opens a new field of colour and other attractive effects that can now be obtained in the art of separable slide fasteners. Modifications of the embodiments described are possible. For example, if the members 4 of Fig. 1 are made of non-metallic material, the stop member 3 shown in Fig. 1 may be dispensed with, as illustrated in Fig. 8 and the two lowermost members 30 and 31 (see Fig. 8) may be glued or otherwise secured together in the position illustrated.

It should be clearly understood that this invention is not limited to the embodiments illustrated which are given by way of example only.

I claim:

1. In and for a separable fastener of the kind described a fastener member provided with complementary interlocking means, a bore extending from one end of the member to the other, and a groove at each end, said bore merging at each end into said groove, the grooves extending in substantially the same direction from said bore.

2. In and for a separable fastener of the kind described a fastener member in the shape of a solid cylinder, one end of which is tapered while the other is correspondingly concave so that a plurality of such members can be nested together with the tapered end of a member accommodated in the adjacent concave end of the next member, said member having a substantially axial bore and a groove at each end, said bore merging at each end into said groove arranged angularly to said bore, both grooves extending in substantially the same direction from said bore.

3. In a separable fastener of the kind described two flexible supports, a plurality of fastener members attached to each support, said fastener members having the shape of a solid cylinder one end of which is tapered while the other end is correspondingly concave so that a plurality of members can be nested together with the tapered end of a member accommodated in the adjacent concave end of the next member, each member having a substantially axial bore and a groove at each end, said bore merging at each end into said groove at an angle, said grooves extending in substantially the same direction from said bore, two filar carriers each threaded through the bores of a plurality of said members thereby to carry them, each carrier being attached to one of said supports with the members fixed at a distance from one another which substantially corresponds to the length of the cylindrical part of a member excluding its tapering part and in such a position relatively to the support that the free ends of said grooves are adjacent said support and each carrier when emerging from one of said bores passing through one of said grooves towards said support, the members of one support being staggered with respect to those of the other.

4. A fastener as claimed in claim 3, wherein the members are made of non-metallic material.

5. A fastener as claimed in claim 3, wherein the carriers are sewn on to the supports.

6. A fastener as claimed in claim 3, wherein the carriers are interwoven with the supports.

7. A fastener as claimed in claim 3, wherein each support consists of a tape having a line of perforations, said tape being folded along said line over said carrier and the members thereon in such a manner that the members protrude through said perforations, the folded over parts of said tape being fixed together.

8. A fastener as claimed in claim 3, wherein the members are made of non-metallic material and the stop member for permanently connecting one end of one support to the other is replaced by securing the last members of the supports together.

9. A fastener member for a separable fastener of the kind described, comprising a body having interlocking means formed thereon, the body being bored to form a channel for threading the member onto a filar carrier, the extremities of the channel being directed away from the interlocking means and towards the same side of the body.

10. In a separable fastener of the kind described two rows of fastener members, a coupling projection and a complementary coupling recess on each of said members, a bore in each member extending in the longitudinal direction of the fastener and passing through said coupling recess, a carrier for each row of said members threaded through the bores of the members of a row, and two flexible supports to which the carriers are joined one to each.

11. A stringer for a separable fastener of the kind described comprising a row of fastener members spaced along a tape, each fastener member having opposite ends forming complementary interlocking parts, a longitudinally disposed bore between said ends and a groove at each end arranged angularly to said bore, said bore merging at each end into said groove, a filar carrier threaded through the bores and passing through the grooves of the fastener members, and means for securing said filar carrier to said tape at the portions of said filar carrier which lie between adjacent fastener members.

12. In a separable fastener of the kind described a plurality of fastener members having channels, a part of the channel in each member extending substantially in the longitudinal direction of the fastener, a carrier for said members passing through said channels, and a flexible support to which said carrier is secured outside said channels, the extremities of said channels being directed away from said longitudinal direction towards said support.

13. A separable fastener as defined in claim 12 and comprising complementary interlocking means at opposite ends of each fastener member, the channel in each member being formed by a bore extending substantially in the longitudinal direction of the fastener and merging at each end into a groove extending from said bore towards the support, for partially accommodating the carrier when emerging from said bore to prevent interference with said interlocking means.

14. In a separable fastener of the kind described a plurality of fastener members arranged in a row, a flexible support for said members, and a carrier for securing said members to said support, said carrier extending in zig-zag manner from end to end of said row of members and securing said members to said support by embracing a part of each member between said carrier and said support, substantially the entire portions of said carrier between any two adjacent members so embraced being secured to said support.

15. In a separable fastener of the kind described a plurality of fastener members, an interlocking portion on each of said members adapted to effect the interlocking of the fastener, a flexible support, a carrier for mounting a member to said support, said carrier being secured to said support and including a loop formed by a portion of said carrier intermediate two points where it is secured to said support for mounting said fastener member onto said support, said loop portion lying in the plane of the support and extending into the longitudinal region of said member, in which lies said interlocking portion.

16. A separable fastener as defined in claim 15 and comprising, on said fastener member, a groove and a bore merging into said groove for partially accommodating said carrier in said groove to prevent interference between said carrier and the interlocking portion.

BELA MEITNER.